US011259271B2

(12) United States Patent
Xu

(10) Patent No.: US 11,259,271 B2
(45) Date of Patent: Feb. 22, 2022

(54) METHODS, APPARATUS AND MACHINE-READABLE MEDIUMS RELATING TO ESTABLISHMENT OF BROADCAST/MULTICAST BEARERS

(71) Applicant: Telefonaktiebolaget LM Ericsson (publ), Stockholm (SE)

(72) Inventor: Wenliang Xu, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/592,932

(22) Filed: Oct. 4, 2019

(65) Prior Publication Data

US 2020/0314800 A1    Oct. 1, 2020

Related U.S. Application Data

(63) Continuation of application No. PCT/EP2019/070620, filed on Jul. 31, 2019.

(30) Foreign Application Priority Data

Apr. 1, 2019  (WO) ............... PCT/CN2019/080818

(51) Int. Cl.
*H04W 72/00*  (2009.01)
*H04L 12/18*  (2006.01)
(Continued)

(52) U.S. Cl.
CPC ......... *H04W 72/005* (2013.01); *H04L 12/185* (2013.01); *H04L 12/1868* (2013.01);
(Continued)

(58) Field of Classification Search
CPC .... H04W 72/005; H04W 4/40; H04L 12/185; H04L 12/1868; H04L 41/0686
See application file for complete search history.

(56) References Cited

U.S. PATENT DOCUMENTS

2009/0086670 A1* 4/2009 Hart
2012/0166617 A1* 6/2012 Chang ................. H04W 76/10
709/224

(Continued)

OTHER PUBLICATIONS

PCT Notification of Transmittal of the International Search Report and the Written Opinion of the International Searching Authority, or the Declaration for International application No. PCT/EP2019/070620—dated Dec. 2, 2019.

(Continued)

*Primary Examiner* — Samina F Choudhry
(74) *Attorney, Agent, or Firm* — Baker Botts, LLP

(57) ABSTRACT

Embodiments of the disclosure provide a method performed by a broadcast/multicast server for a communication network. The method comprises: receiving, from an application server, a request to establish a broadcast/multicast bearer in the communication network; allocating resources associated with the broadcast/multicast bearer in the communication network; and sending, to the application server, a response message comprising an indication of whether the allocation of the resources associated with the broadcast/multicast bearer is ongoing or not. Corresponding apparatus and methods and apparatus in the application server, are also provided.

15 Claims, 9 Drawing Sheets

(51) Int. Cl.
  *H04W 4/40* (2018.01)
  *H04W 4/06* (2009.01)
  *H04L 41/0686* (2022.01)

(52) U.S. Cl.
  CPC .......... *H04L 41/0686* (2013.01); *H04W 4/06* (2013.01); *H04W 4/40* (2018.02)

(56) References Cited

U.S. PATENT DOCUMENTS

2017/0339723 A1* 11/2017 Fujishiro
2019/0174270 A1* 6/2019 Shan

OTHER PUBLICATIONS

SA WG2 Meeting #124 (SA WG2 Temporary Document); Reno, Nevada, US; Change Request; Title: MB2 Improvements for GCS AS to be able to Request Application of FEC and/or ROHC to a MBMS Bearer; Source to WG: Nokia, Nokia Shanghai Bell; Source to TSG: SA WG2 (S2-178942, was S2-178764)—Nov. 27-Dec. 1, 2017.

TSG-CT WG3 Meeting #102; Xi An, China; Change Request; Title: MBMS Bearer Activation in Progress; Source to WG: Ericsson; Source to TSG: C3 (C3-191249, revision of C3-191170)—Apr. 8-12, 2019.

3GPP TSG-SA WG2 Meeting #123; Ljubljiana, Slovenia; Change Request; Title: MBMS Session Setup Procedure/Event Notification Alignment with RAN3; Source to WG: Ericsson; Source to TSG: S2 (S2-177581, revision of S2-176898)—Oct. 23-27, 2017.

3GPP TS 23.246 v15.0.0; Technical Specification; 3rd Generation Partnership Project; Technical Specification Group Services and System Aspects; Multimedia Broadcast/Multicast Service (MBMS); Architecture and functional description (Release 15)—Dec. 2017.

3GPP TS 23.280 v15.6.0; Technical Specification; 3rd Generation Partnership Project; Technical Specification Group Services and System Aspects; Common functional architecture to support mission critical services; Stage 2 (Release 15)—Mar. 2019.

3GPP TS 23.468 v15.0.0; Technical Specification; 3rd Generation Partnership Project; Technical Specification Group Services and System Aspects; Group Communication System Enablers for LTE (GCSE_LTE); Stage 2 (Release 15)—Dec. 2017.

3GPP TS 29.468 v15.5.0; Technical Specification; 3rd Generation Partnership Project; Technical Specification Group Core Network and Terminals; Group Communication System Enablers for LTE (GCSE_LTE); MB2 Reference Point Stage 3 (Release 15)—Mar. 2019.

* cited by examiner

METHODS, APPARATUS AND MACHINE-READABLE MEDIUMS RELATING TO ESTABLISHMENT OF BROADCAST/MULTICAST BEARERS

PRIORITY

This nonprovisional application is a Continuation of International Patent Application Serial No. PCT/EP2019/070620 filed Jul. 31, 2019 and entitled "METHODS, APPARATUS AND MACHINE-READABLE MEDIUMS RELATING TO ESTABLISHMENT OF BROADCAST/MULTICAST BEARERS" which claims priority to International Patent Application No. PCT/CN2019/080818 filed Apr. 1, 2019 both of which are hereby incorporated by reference in their entirety.

TECHNICAL FIELD

Embodiments of the present disclosure relate to communication networks, and particularly provide methods, apparatus and machine-readable mediums relating to the establishment or activation of broadcast/multicast bearers.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, mean step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Mission Critical (MC) service utilizes MBMS (Multimedia Broadcast and Multicast Service) to provide service to MC UEs (e.g., as described in 3GPP TS 23.280, v 16.2.0, subclause 10.7), MBMS bearers can be used by any MC service for any MC service group. A single MBMS bearer can be used for one or more MC services within a single group or by multiple groups in parallel.

The following passages specify the procedures and information flows for the usage of MBMS transmission that are utilised by the following MC services:
  Mission critical push-to-talk (MCPTT);
  Mission critical video (MCVideo); and
  Mission critical data (MCData).

The MBMS high-level requirements, including architecture and functions, are described in 3GPP TS 23.246, v 16.0.0.

Among the MBMS bearer operation procedures described in 3GPP TS 23,280 subclause 10.7 (cited above), there is an MBMS bearer event notification procedure.

The MC service server is an instantiation of a Group Communication Service Application Server (GCS AS). For the MC service server to know the status, of the MBMS bearer, and thus know the network's ability to deliver the service, it is required that the network provides MBMS bearer event notifications to the MC service server. The different events notified to the MC service server include one or more of: the MBMS bearer start result (e.g. when the first cell successfully allocated MBMS resources), including information indicating if any cells fail to allocate MBMS resources to a specific MBMS bearer; the current status of the MBMS bearer; and MBMS bearer suspension/resume or overload scenarios.

FIG. 1 shows the information flows in a MBMS bearer event notification, for mission-critical services. The figure corresponds to FIG. 10.7.3.102-1 in 3GPP TS 23,280, v 162.0. In step 3 of FIG. 1, the broadcast/multicast service centre (BM-SC) initiates procedures to setup or establish an MBMS bearer, and to allocate resources for the MBMS bearer in the radio access network (RAN). This process is described in 3GPP TS 23.246, subclause 8.3.2 (referenced above), and shown below in FIGS. 2a and 2b. The procedures in FIGS. 2a and 2b differ according to the configuration of the MBMS gateway (MBMS GW). In FIG. 2a, the MBMS GW is configured to send a response message immediately to the initial session start request from the BM-SC, and potentially before the RAN resources have been allocated for the MBMS bearer. In FIG. 2b, the MBMS GW is configured to send the response message to the BM-SC only after receiving confirmation from the MME that RAN resources have been successfully allocated for the MBMS bearer.

Thus there are to possible choices for network operators: either the MBMS GW is configured to respond immediately to the request to establish an MBMS bearer (and prior to resources being allocated for the MBMS bearer in the RAN), or the MBMS GW is configured to respond only once the resources are allocated in the RAN and the MBMS bearer is established. Which configuration is chosen will affect the ability of the application server which requested the MBMS bearer to utilize it in a timely and reliable manner.

There currently exist certain challenge(s).

As noted above, the MC service server is an instantiation of a group communication service application server (GCS AS). 3GPP TS 23.468, v 15.0.0 defines the procedures by which a GCS AS communicates with the BM-SC.

FIG. 3 shows the procedure for activating an MBMS bearer, and corresponds to FIG. 5.12.3.2-1 of 3GPP TS 23.468, v 15.0.0. As the MC service server is an instantiation of a GCS AS, FIG. 3 must be viewed in conjunction with FIGS. 2a and 2b.

For example, in FIG. 3, step 1 comprises the BM-SC receiving an Activate MBMS bearer Request. It can be seen that the BM-SC responds to that request message by allocating resources in the MBMS system to support the data flow. That is, the BM-SC follows the procedure set out in FIG. 2a or 2b. In step 3 of FIG. 3, the BM-SC sends a response message to the GCS AS (Activate MBMS Bearer Response).

FIG. 3 shows that the BM-SC may subsequently (following allocation of RAN resources in step 4) send an MBMS Delivery Status Indication to the GCS AS in step 5, confirming that RAN resources have been allocated and the MBMS bearer is established and available for use. Such an indication may be sent in step 5 following receipt of the delayed session start response message from the MBMS GW (see step 2 in FIG. 2b). However, at the time of receiving the Activate MBMS Bearer Response message in step 3, the GCS AS has no knowledge of whether the MBMS bearer is established, or whether establishment is ongoing (i.e., whether a further message will be sent in step 5 or not).

This can lead either to unnecessary delay, if the GCS AS was to wait for the further message in step 5, or to failed use of the MBMS bearer, if the GCS AS was to attempt to use the MUMS bearer before it was established.

SUMMARY

Certain aspects of the present disclosure and their embodiments may provide solutions to these or other challenges. For example, in one aspect, an indication is introduced to the response to the activation of MBMS bearer request (sent in step 3 of FIG. 3), indicating whether bearer activation is ongoing or not.

There are, proposed herein, various embodiments which address one or more of the issues disclosed herein.

In one aspect the disclosure provides a method performed by a broadcast/multicast server in a communication network. The method comprises: receiving, from an application server, a request to establish a broadcast/multicast bearer in the communication network; allocating resources associated with the broadcast/multicast bearer in the communication network; and sending, to the application server, a response message comprising an indication of whether the allocation of the resources associated with the broadcast/multicast bearer is ongoing or not.

In another aspect, the disclosure provides a method performed by an application server. The method comprises: sending, to a broadcast/multicast server for a communication network, a request to establish a broadcast/multicast bearer in the communication network; and receiving, from the broadcast/multicast server, a response message comprising an indication of whether the allocation of the resources associated with the broadcast/multicast bearer is ongoing or not.

In one example, there is provided a method performed by a broadcast/multicast server for a communication network. The method comprises: receiving, from an application server, a request to establish a broadcast/multicast bearer in the communication network; initiating establishment of the broadcast/multicast bearer in the communication network; and sending, to the application server, a response message comprising an indication of whether the establishment of the broadcast/multicast bearer is ongoing or not.

In a further example, there is provided a method performed by an application server. The method comprises: sending, to a broadcast/multicast server for a communication network, a request to establish a broadcast/multicast bearer in the communication network; and receiving, from the broadcast/multicast server, a response message comprising an indication, of whether the establishment of the broadcast/multicast bearer is ongoing or not.

Apparatus for performing these methods is also provided. For example, a broadcast/multicast server may be provided with processing circuitry configured to perform the method according to the first aspect recited above. In another example, an application server may be provided with processing circuitry configured to perform the method according to the second aspect recited above. The broadcast/multicast server and/or the application server may be provided with power supply circuitry.

Certain embodiments may provide one or more technical advantage(s), such as preventing unnecessary delay to multicast/broadcast services of the GCS AS was to wait for the further message in step 5 of FIG. 3), or preventing failed use of the bearer (if the GCS AS was to attempt to use the MBMS bearer before it was established or activated).

BRIEF DESCRIPTION OF THE DRAWINGS

To better illustrate embodiments of the present disclosure, and to more-clearly show they may be carried into effect, reference is now made to the following drawings.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
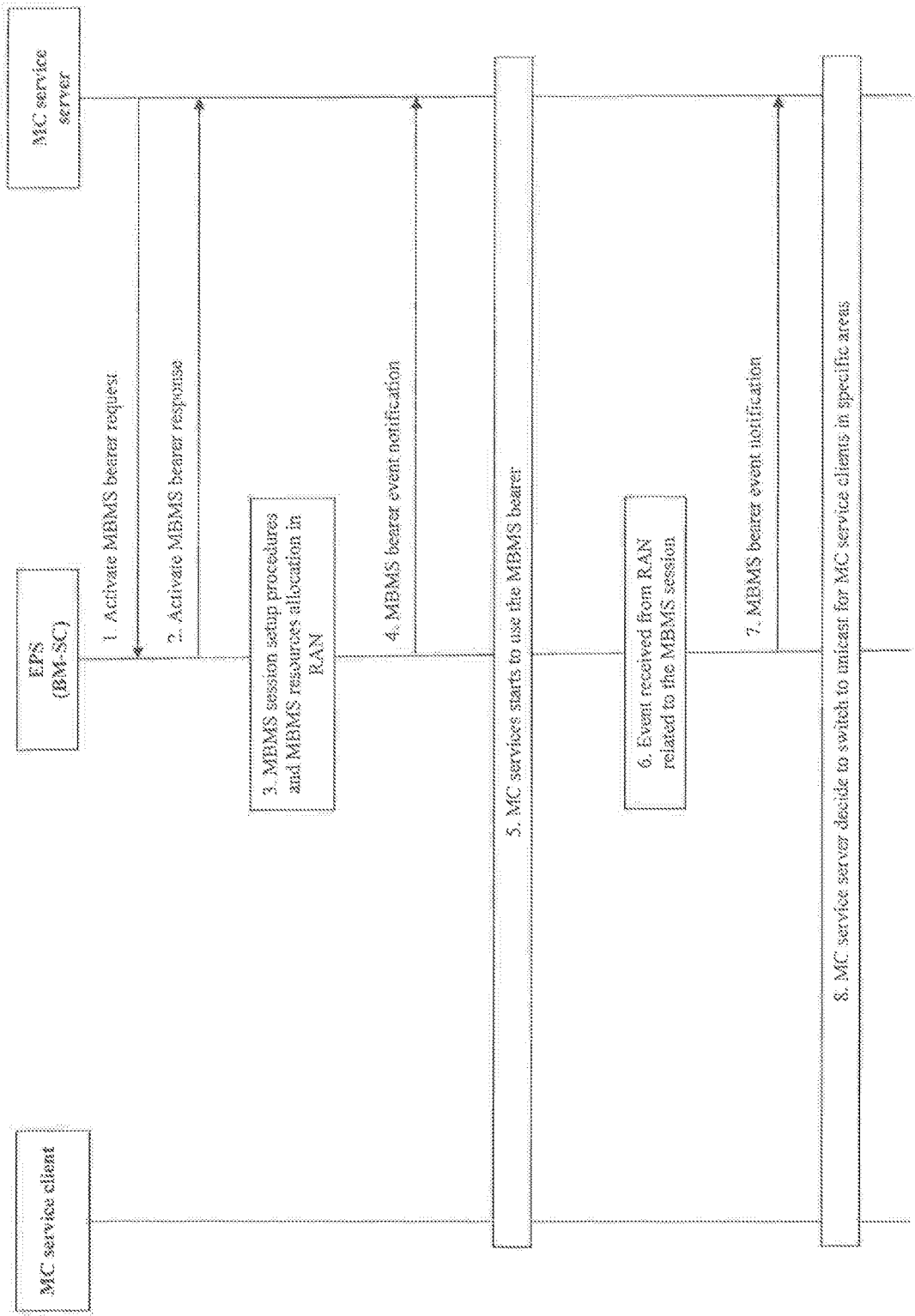
FIG. 1 shows the information flows in a MBMS bearer event notification.
Figure 2A:
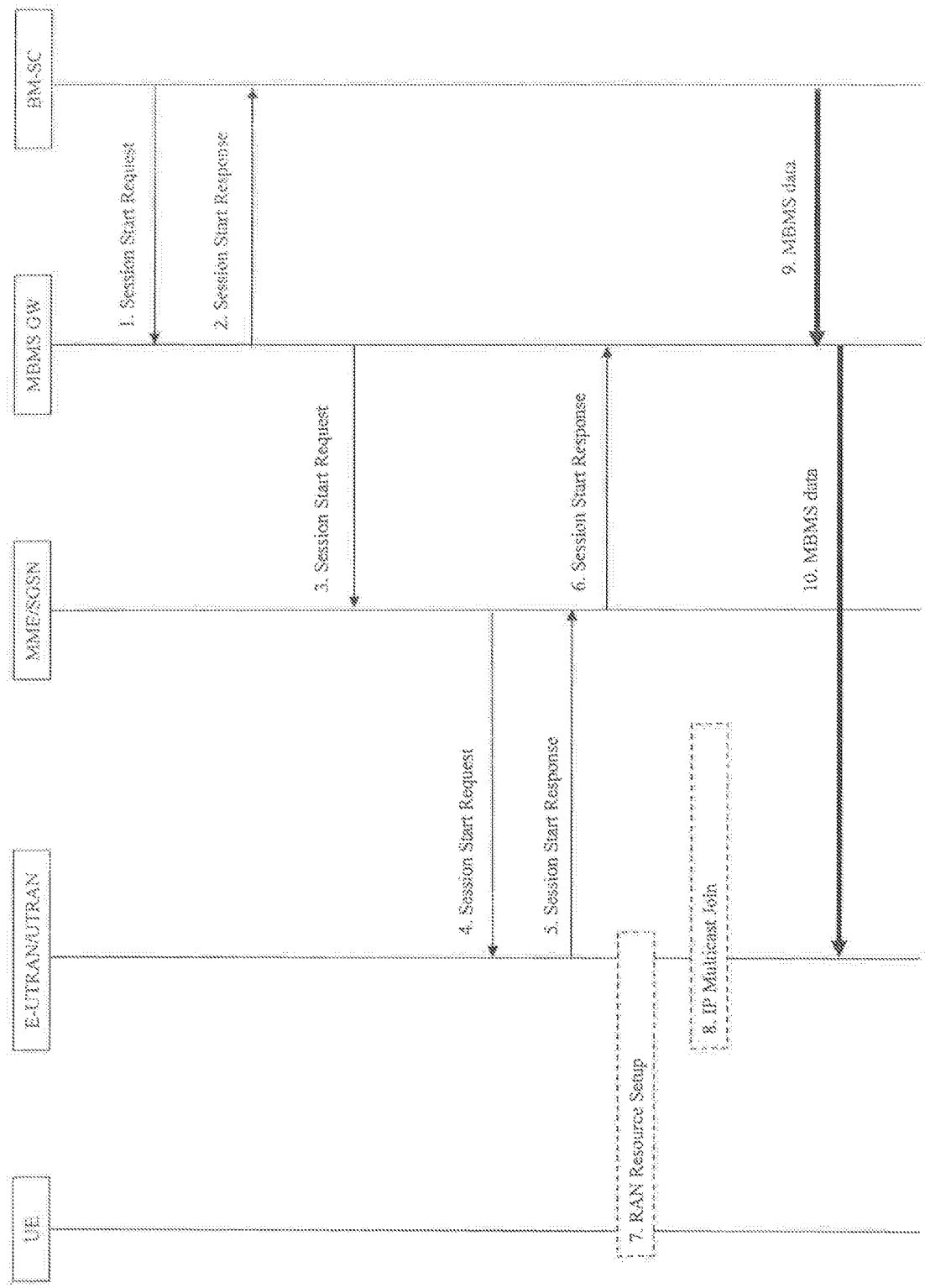
FIG. 2a shows the Session Start procedure for E-UTRAN and UTRAN for EPS.
Figure 2B:
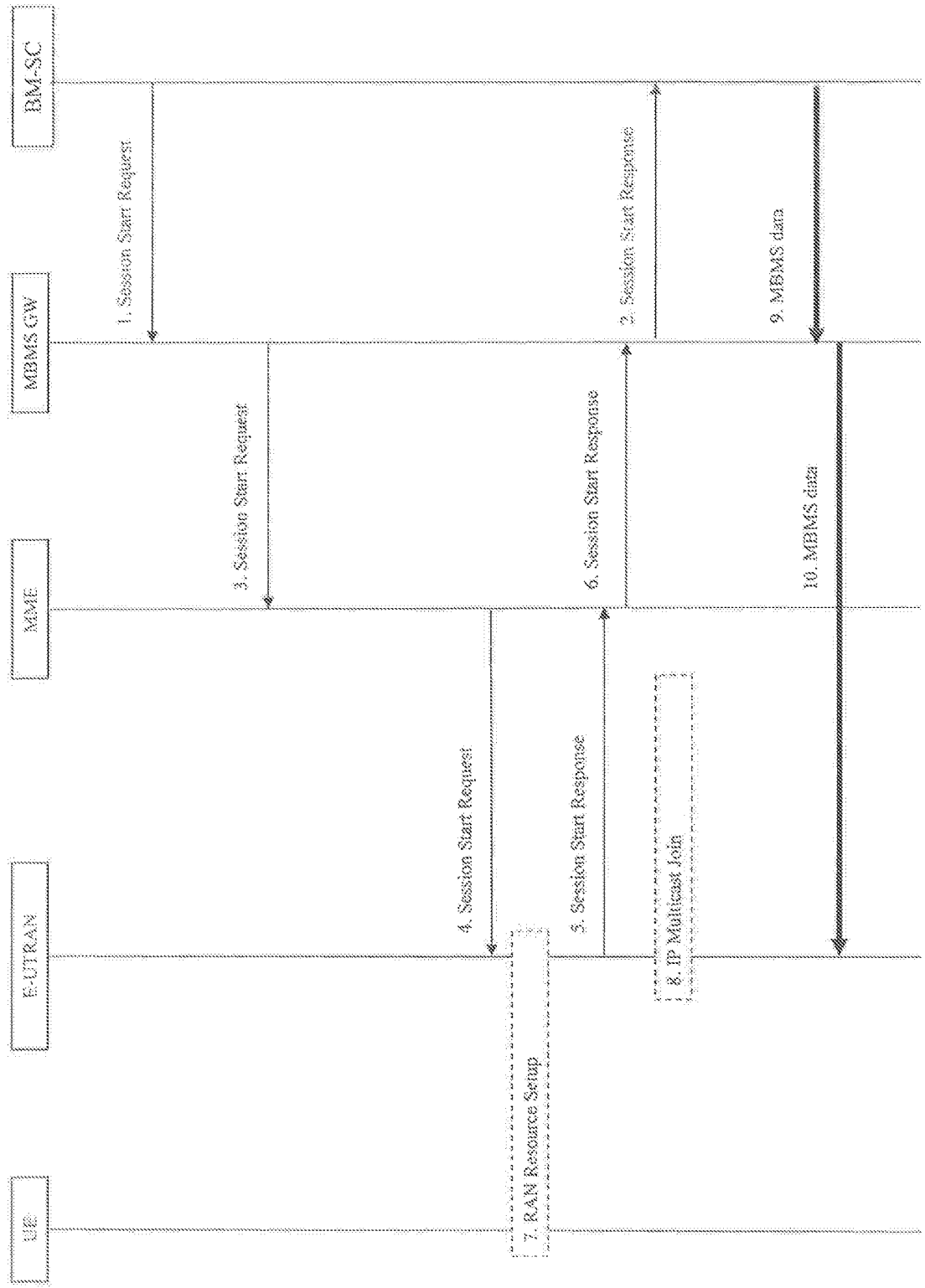
FIG. 2b shows the Session Start procedure for E-UTRAN for EPS with delayed response.
Figure 3:
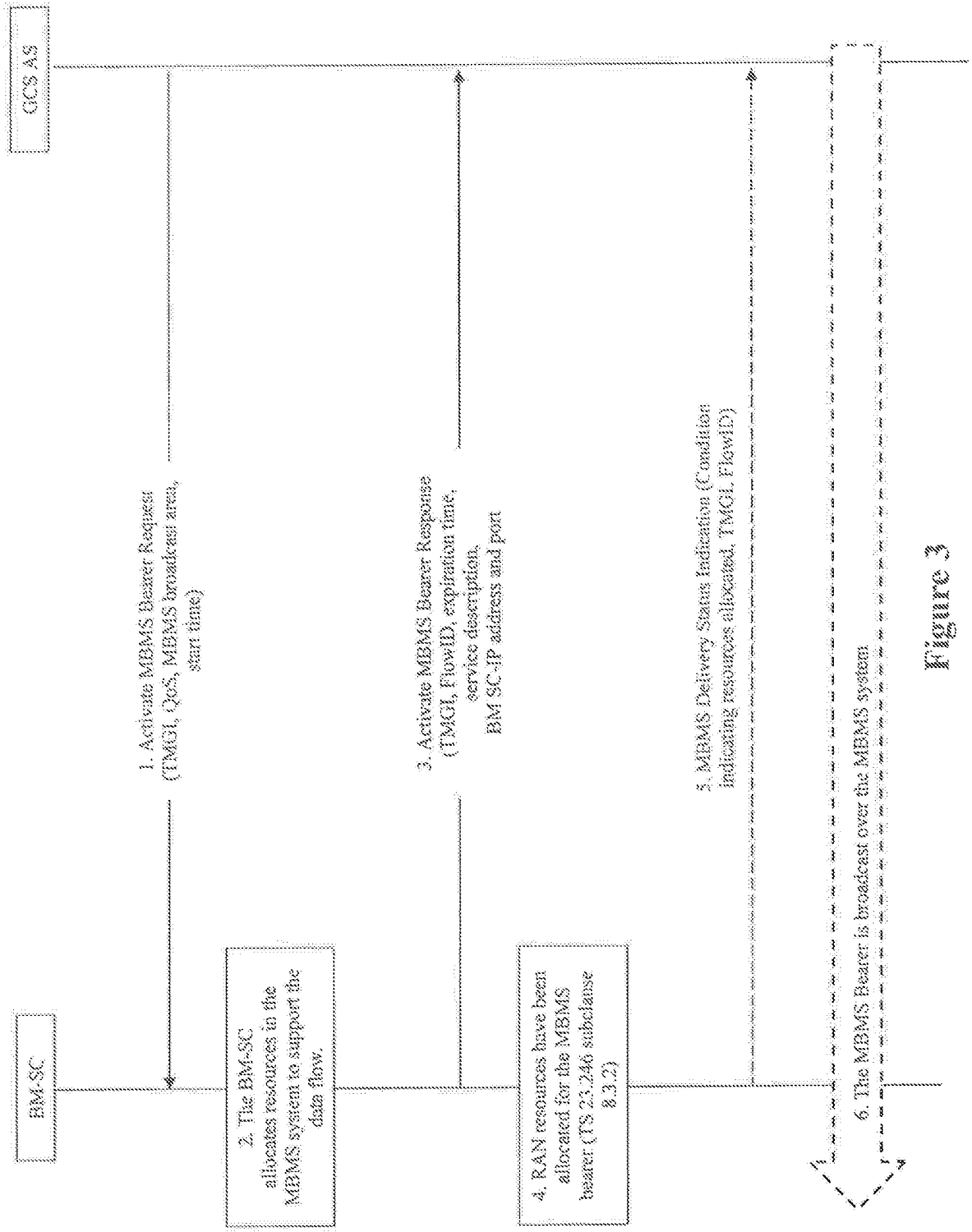
FIG. 3 shows the MBMS Activate MBMS Bearer Procedure.

According to embodiments of the disclosure, the signalling diagram shown in FIG. 3 above is enhanced by providing an indication in the Activate MBMS Bearer Response message (sent in step 3) as to whether the allocation of resources associated with the MBMS bearer is ongoing or not, e.g., whether or not the GCS AS should wait for a further message (e.g., the MBMS Delivery Status Indication in step 5) confirming the allocation of resources for the MBMS bearer in the RAN before attempting to transmit data via the MBMS bearer. For example, if the BM-SC is configured, to receive a delayed session start response from the MBMS GW, the BM-SC may indicate that the bearer activation procedure is still in progress in the MBMS-Bearer-Result attribute-value pair (e.g., by way of a bitmap as described below with respect to FIG. 4). These and other embodiments are discussed in more detail below particularly with respect to FIGS. 4, 5, 6 and 7.

Figure 4:
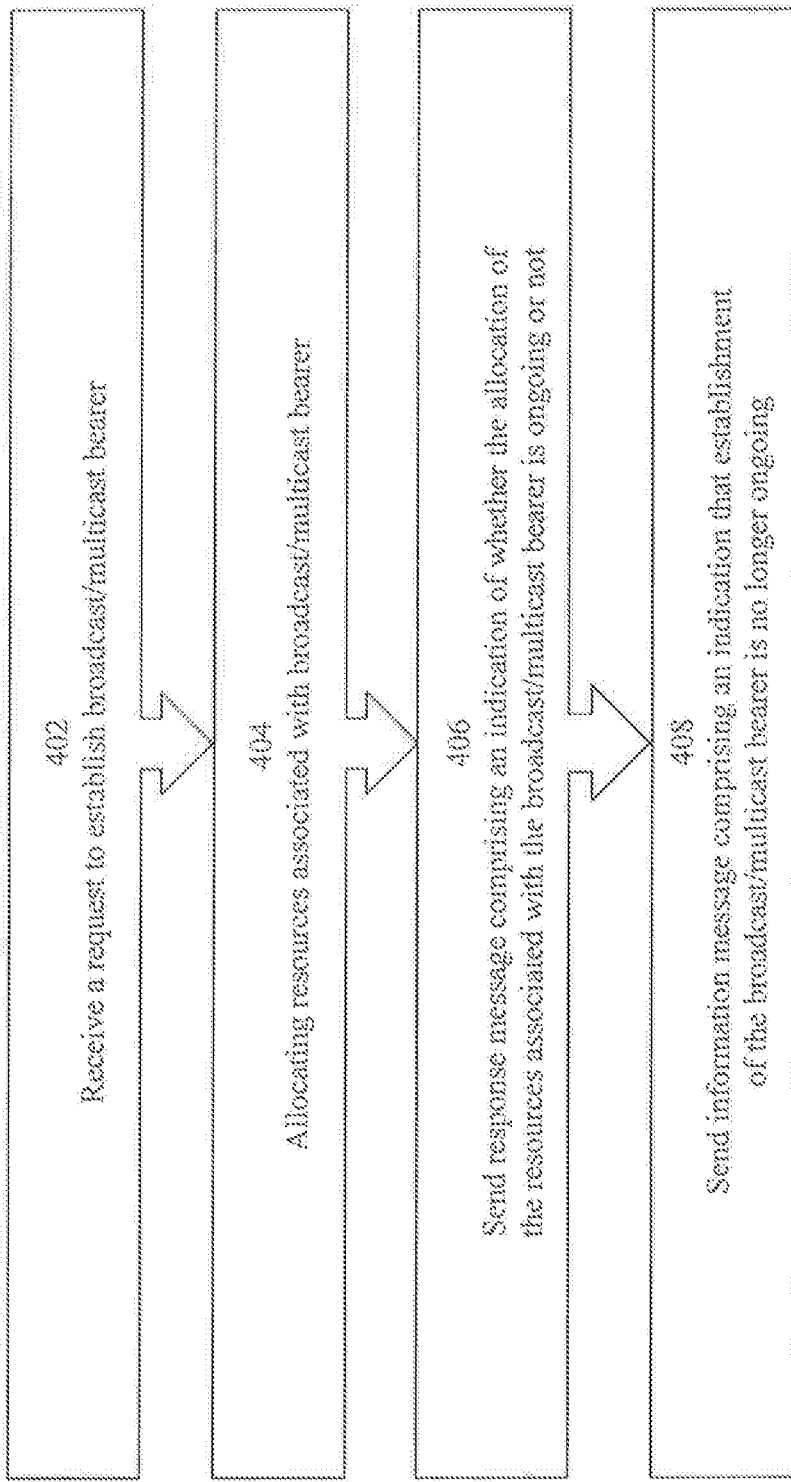
FIG. 4 is a flowchart of a method performed by a broadcast/multicast server according to embodiments of the disclosure.

FIG. 4 depicts a method in accordance with particular embodiments. The method may be performed by a broadcast/multicast server for a communication network, such as the BM-SC described above with respect to FIGS. 1, 2a, 2b and 3.

The method begins at step 402, in which the broadcast/multicast server receives, from an application server, a request to establish a broadcast/multicast bearer in the communication network. For example, the broadcast/multicast bearer may be an MBMS bearer, and thus step 402 may correspond substantially, to step 1 in FIG. 3 above.

The application server may implement any service which requires or may make use of multicast or broadcast services. Embodiments of the present disclosure may have the technical effect of increasing the reliability of broadcast/multicast bearers, particularly upon activation of such bearers, and therefore in certain embodiments the application server may implement a service which requires a particularly reliable service. Examples of such services include mission critical (MC) services, as discussed above (in which case the application server maybe a mission critical service server), but also other services such as vehicle-to-everything (V2x) services. The present disclosure is not limited in that respect.

The request to establish a broadcast/multicast bearer may comprise one or more of: an identifier for the group of wireless devices addressed by the broadcast/multicast bearer (e.g., a temporary identity such as a temporary mobile group identity, TMGI); an indication of a quality of service for the broadcast/multicast bearer; a broadcast area to be covered by the broadcast/multicast bearer; and a start time for the broadcast/multicast bearer.

In step 404, the broadcast/multicast server initiates allocation of resources associated with the broadcast/multicast bearer in the communication network. This step may correspond substantially to step 2 in FIG. 3 shown above. For example, the broadcast/multicast server may initiate establishment of the broadcast/multicast bearer.

Thus, in one embodiment, the broadcast/multicast server allocates resources in the broadcast/multicast system to support the data flow for the broadcast/multicast bearer. For example, the broadcast/multicast server may assign one or more of: an identity for the data flow (e.g., a FlowID); an expiration time for the broadcast/multicast bearer; a description of the service provided by the broadcast/multicast server; an IP address for the broadcast/multicast bearer in the broadcast/multicast server; and a port for the broadcast/multicast bearer in the broadcast/multicast server.

In one embodiment the broadcast/multicast server may additionally or alternatively transmit a session start request to an MBMS GW (e.g., as shown above in step 1 of FIGS. 2a and 2b).

In step 406, the broadcast/multicast server sends, the application server, a response message. This step may correspond substantially to step 3 in FIG. 3 above, thus the response message may comprise an Activate MBMS Bearer Response. For example, the response message may comprise one or more of: the identifier for the group of wireless devices addressed by the broadcast/multicast bearer; the identity for the data flow (e.g., a FlowID); the expiration time for the broadcast/multicast bearer; the description of the service provided by the broadcast/multicast server; the IP address for the broadcast/multicast bearer in the broadcast/multicast server; and the port for the broadcast/multicast bearer in the broadcast/multicast server.

According to embodiments of the disclosure (see also Appendix 1 below), the response message further comprises an indication of whether the allocation of resources associated with the broadcast/multicast bearer is ongoing or not. Alternatively stated, the response message contains an indication as to whether or not a further notification will arrive (e.g., as described in step 5 of FIG. 3 above) to confirm that resources have been allocated for the broadcast/multicast bearer in a radio-access network (RAN) of the communication network.

The indication may be provided via any suitable mechanism. In one embodiment, the indication is provided by a bitmap, which comprises one or more bits, the setting of which indicates one of: establishment of the broadcast/multicast bearer was successful; establishment of the broadcast/multicast fearer failed; and allocation of resources associated with the broadcast/multicast bearer is ongoing (or establishment of the broadcast/multicast bearer is ongoing). In some embodiments, multiple bits may be provided to indicate that establishment of the broadcast/multicast bearer failed, with each of the multiple bits corresponding to a particular reason for the failure. In some embodiments, the indication that allocation of resources associated with the broadcast/multicast bearer is, ongoing may be provided by setting the bit which is indicative of establishment of the broadcast/multicast bearer being ongoing. In further embodiments, the indication that allocation of resources associated with the broadcast/multicast bearer is ongoing may be provided by setting the bit which is indicative of allocation of resources associated with the broadcast/multicast bearer being ongoing, together with the bit which is indicative of establishment of the broadcast/multicast bearer being successful.

In one example, the bitmap may be configured as follows:

| Bit Name | Description |
| --- | --- |
| 0 Success | The requested bearer activation, modification or deactivation was successful; or the request for bearer activation was successfully handled. |
| 1 Authorization rejected | The requested bearer activation, modification or deactivation failed because the BM-SC did not authorize it. |
| 2 Resources exceeded | The requested bearer activation, modification or deactivation failed because the BM-SC could not provide sufficient resources. |
| 3 Unknown TMGI | The requested bearer activation, modification or deactivation failed because the BM-SC-did not know the requested TMGI or the TMGI expired. |
| 4 TMGI not in use | The requested bearer modification or deactivation failed because the requested TMGI was not related to an active MBMS bearer. |
| 5 Overlapping MBMS-Service-Area | The requested bearer modification failed because the requested Service area was overlapping with a service area already in use for the requested TMGI. |
| 6 Unknown Flow Identifier | The requested bearer modification or deactivation failed because the BM-SC did not know the requested Flow Identifier. |
| 7 QoS Authorization Rejected | The requested bearer activation or modification failed because the BM-SC did not authorize the requested QoS. |
| 8 Unknown MBMS-Service-Area | The requested bearer activation or modification failed because the BM-SC did not know the requested MBMS-Service-Area |
| 9 MBMS-Service-Area Authorization Rejected | The requested bearer activation or modification failed because the BM-SC did not authorize the requested MBMS-Service-Area |
| 10 MBMS-Start-Time | The requested bearer activation failed because the MBMS-Start-Time contained an inappropriate value. |
| 11 Invalid AVP combination | The requested bearer activation, modification or deactivation failed because the provided AVP combination within the corresponding MBMS-Bearer-Request AVP was not allowed (e.g. because some mandatory AVPs for a given MBMS-StartStop-Indication value were missing). |
| 12 System error | The requested procedure (e.g. bearer activation/modification) failed due to internal system error in the BM-SC. |
| xx Activation ongoing | The requested bearer activation is still ongoing. |

Here "xx" is used to indicate that the bit may be placed at any suitable position.

In step 408, optionally, the broadcast/multicast server sends an information message to the application server, comprising an indication that activation of the broadcast/ multicast bearer is no longer ongoing. This step may correspond substantially to optional step 5 in FIG. 3 above. Thus the information message may comprise an indication that resources have been allocated for the broadcast/multicast bearer in the RAN. For example, one or more radio access nodes may have reported (e.g., in a session start response message such as that sent above in step 5 of FIGS. 2a and 2b) that radio resources have been allocated to the broadcast/ multicast bearer in the cells served by those radio access nodes.

The information message may further comprise one or more of: the identifier for the group of wireless devices addressed by the broadcast/multicast bearer; and the identity for the data flow (e.g., a FlowID).

Thus, according to the above embodiment, the broadcast/ multicast server provides an indication of whether the activation or establishment of the broadcast/multicast bearer is ongoing in its response to the request message. The application server is thus informed as to whether or not to await a further information message confirming that resources have been allocated for the broadcast/multicast bearer in the RAN. Additionally or alternatively (see also Appendix 2 below), the application server may be informed of the broadcast/multicast server's configuration in a features message, comprising an indication of the configuration of the broadcast/multicast server with respect to delayed response to the request message in step 1 (e.g., whether the broadcast/ multicast server is configured to receive a delayed response or not). Such a features message may be transmitted to the application server upon the application server establishing initial contact with the broadcast/multicast server. In this way, the application server is also informed whether to expect a further information message (e.g., as in step 408 above) after receipt of the initial response message in step 406.

Figure 5:
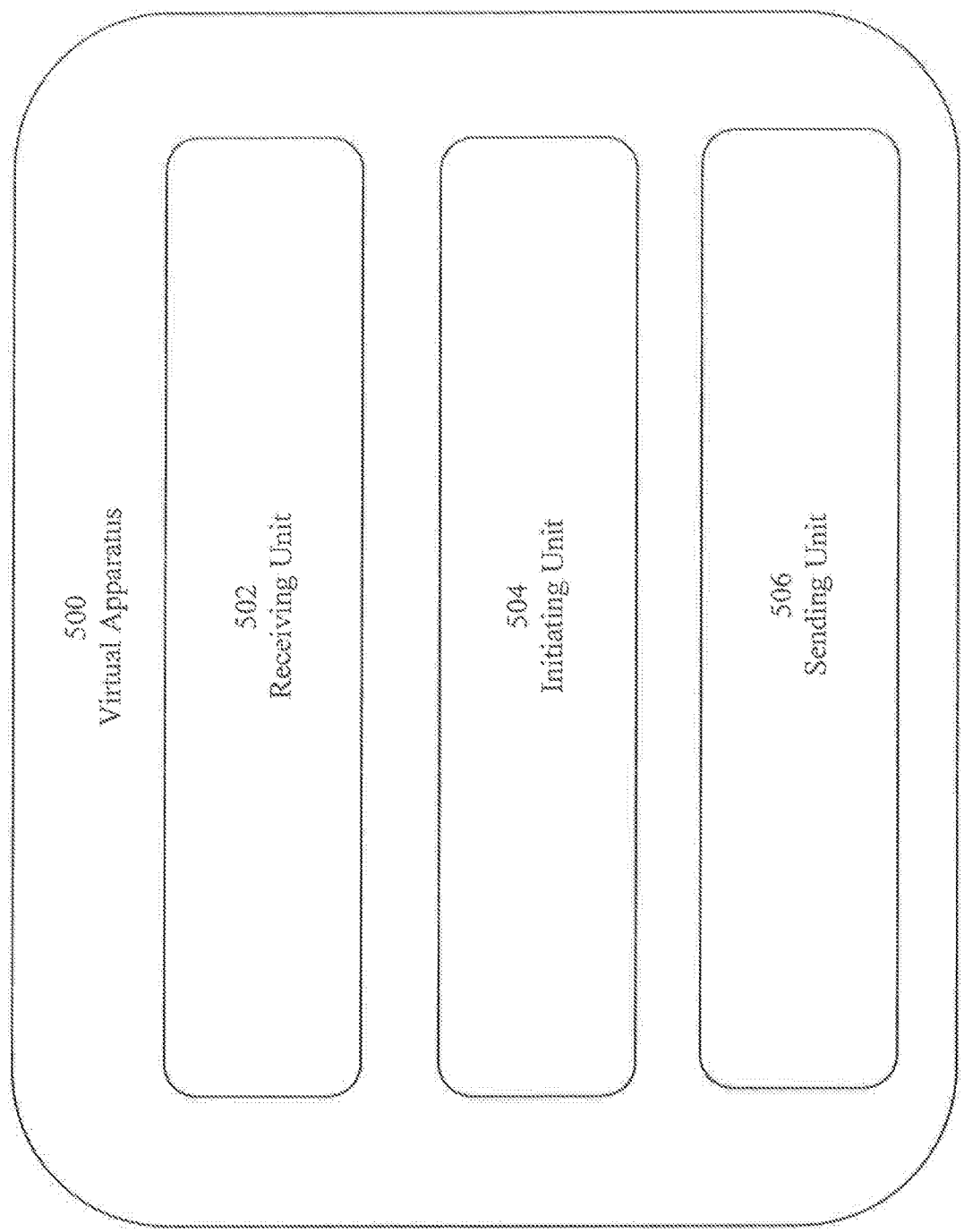
FIG. 5 is a schematic diagram of a virtual apparatus, configured to perform the method of FIG. 4.

FIG. 5 illustrates a schematic block diagram of an apparatus 500 in a communication network (for example, the broadcast multicast service centre shown in FIGS. 1, 2a, 2b and 3). The apparatus may be implemented in a network node. Apparatus 500 is operable to carry out the example method described with reference to FIG. 4 and possibly any other processes or methods disclosed herein. It is also to be understood that the method of FIG. 4 is not necessarily carried out solely by apparat 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 502, initiating unit 504 and sending unit 506, and any other suitable units of apparatus 500 to perform corresponding functions according one or more embodiments of the present disclosure. Apparatus 500 may further comprise power supply circuitry configured to supply power to the apparatus.

As illustrated in FIG. 5, apparatus 500 includes receiving unit 502, initiating unit 504 and sending unit 506. Receiving unit 502 is configured to receive from an application server, a request to establish a broadcast/multicast bear in the communication network. Initiating unit 504 is configured to initiate allocation of resources associated with the broadcast/ multicast bearer in the communication network. Sending unit 506 is configured to send, to the application server, a response message comprising an indication of whether the allocation of the resources associated with the broadcast/ multicast bearer is ongoing or not.

FIG. 5 depicts a method in accordance with particular embodiments. The method may be performed by an application server, such as the GCS AS described above with respect to FIG. 3. The application server may implement any service which requires or may make use of multicast or broadcast services. Embodiments of the present disclosure may have the technical effect of increasing the reliability of broadcast/multicast bearers, particularly upon activation of such bearers, and therefore in certain embodiments the application server may implement a service which requires a particularly reliable service. Examples of such services include mission critical (MC) services, as discussed above (in which case the application server maybe a mission critical service server), but also other services such as vehicle-to-everything (V2x) services. The present disclosure is not limited in that respect.

The method begins at step 602, in which the application server sends, to a broadcast/multicast server (such as the BM-SC described above), a request to establish a broadcast/ multicast bearer in the communication network. For example, the broadcast/multicast bearer may be an MBMS bearer, and thus step 602 may correspond substantially to step 1 in FIG. 3 above.

The request to establish a broadcast/multicast bearer may comprise one or more of: an identifier for the group of wireless devices addressed by the broadcast/multicast bearer (e.g., a temporary identity such as a temporary mobile group identity, TMGI); an indication of a quality of service for the broadcast/multicast bearer; a broadcast area to be covered by the broadcast/multicast bearer; and a start time for the broadcast/multicast bearer.

In step 604 the application server receives, from the broadcast/multicast server, a response message. This step may correspond substantially to step 3 in FIG. 3 above, thus the response message may comprise an Activate MBMS Bearer Response. For example, the response message may comprise one or more of: the identifier for the group of wireless devices addressed by the broadcast/multicast bearer; the identity for the data flow (e.g., a FlowID); the expiration time for the broadcast/multicast bearer; the description of the service provided by the broadcast/multicast server; the IP address for the broadcast/multicast bearer in the broadcast/multicast server; and the port for the broadcast/multicast bearer in the broadcast/multicast server.

According to embodiments of the disclosure (see also Appendix 1 below), the response message further comprises an indication of whether the allocation of resources associated with the broadcast/multicast bearer is ongoing or not. Alternatively stated, the response message contains an indication as to whether or not a further notification will arrive (e.g., as described in step 5 of FIG. 3 above) to confirm that resources have been allocated for the broadcast/multicast bearer in a radio-access network (RAN) of the communication network.

The indication may be provided via any suitable mechanism. In one embodiment, the indication is provided by a bitmap, which comprises one or more bits, the setting of which indicates one of: establishment of the broadcast/multicast bearer was successful; establishment of the broadcast/multicast bearer failed; and allocation of resources associated with the broadcast/multicast bearer is ongoing (or establishment of the broadcast/multicast bearer is ongoing). In some embodiments, multiple bits may be provided to indicate that establishment of the broadcast/multicast bearer failed, with each of the multiple bits corresponding to a particular reason for the failure. In some embodiments, the indication that the allocation of resources associated with the broadcast/multicast bearer is ongoing may be provided by setting the bit which is indicative of establishment of the broadcast/multicast bearer being ongoing. In further embodiments, the indication that the allocation of resources associated with the broadcast/multicast bearer is ongoing may be provided by setting the bit which is indicative of allocation of resources associated with the broadcast/multicast bearer being ongoing, together with the bit which is indicative of establishment of the broadcast/multicast bearer being successful.

In one example, the bitmap may be configured as follows:

| Bit | Name | Description |
| --- | --- | --- |
| 0 | Success | The requested bearer activation, modification or deactivation was successful; or the request for bearer activation was successfully handled. |
| 1 | Authorization rejected | The requested bearer activation, modification or deactivation failed because the BM-SC did not authorize it. |
| 2 | Resources exceeded | The requested bearer activation, modification or deactivation failed because the BM-SC could not provide sufficient resources. |
| 3 | Unknown TMGI | The requested bearer activation, modification or deactivation failed because the BM-SC did not know the requested TMGI or the TMGI expired. |
| 4 | TMGI not in use | The requested bearer modification or deactivation failed because the requested TMGI was not related to an active MBMS bearer. |
| 5 | Overlapping MBMS-Service-Area | The requested bearer modification failed because the requested Service area was overlapping with a service area already in use for the requested TMGI. |
| 6 | Unknown Flow Identifier | The requested bearer modification or deactivation failed because the BM-SC did not know the requested Flow Identifier. |
| 7 | QoS Authorization Rejected | The requested bearer activation or modification failed because the BM-SC did not authorize the requested QoS. |
| 8 | Unknown MBMS-Service-Area | The requested bearer activation or modification failed because the BM-SC did not know the requested MBMS-Service-Area |
| 9 | MBMS-Service-Area Authorization Rejected | The requested bearer activation or modification failed because the BM-SC did not authorize the requested MBMS-Service-Area |
| 10 | MBMS-Start-Time | The requested bearer activation failed because the MBMS-Start-Time contained an inappropriate value. |
| 11 | Invalid AVP combination | The requested bearer activation, modification or deactivation failed because the provided AVP combination within the corresponding MBMS-Bearer-Request AVP was not allowed. (e.g, because some mandatory AVPs for a given MBMS-StartStop-Indication value were missing). |
| 12 | System error | The requested procedure (e.g, bearer activation/modification) failed due to internal system error in the BM-SC. |
| xx | Activation ongoing | The requested bearer activation is still ongoing. |

Here "xx" is used to indicate that the bit may be placed at any suitable position.

In step 606, optionally, the application server receives, from the broadcast/multicast server, an information message comprising an indication that allocation of resources associated with the broadcast/multicast bearer is no longer ongoing (i.e. the activation of the broadcast/multicast bearer is no longer ongoing). This step may correspond substantially to optional step 5 in FIG. 3 above. Thus the information message may comprise an indication that resources have been allocated for the broadcast/multicast bearer in the RAN. For example, one or more radio access nodes may have reported (e.g., in a session start response message such as that sent above in step 5 of FIGS. 2a and 2b) that radio resources have been allocated to the broadcast/multicast bearer in the cells served by those radio access nodes.

The information message may further comprise one or more of: the identifier for the group of wireless devices addressed by the broadcast/multicast bearer; and the identity for the data flow (e.g., a FlowID).

In Step 608, the application server initiates transmission of data over the established broadcast/multicast bearer. For example, step 608 may take place immediately after step 604 if the response message indicates that the activation or establishment of the broadcast/multicast bearer was successful and/or is not ongoing. Alternatively, step 608 may take place responsive to receipt of the information message in step 606, where the response message comprises an indication that the activation or establishment of the broadcast/multicast bearer is ongoing.

Thus, according to the above embodiment, the broadcast/multicast server provides an indication of whether the allocation of resources associated with the broadcast/multicast bearer is ongoing in its response to the request message. The application server is thus informed as to whether or not to await a further information message confirming that resources have been allocated for the broadcast/multicast bearer in the RAN. Additionally or alternatively (see also Appendix 2 below), the application server may be informed of the broadcast/multicast server's configuration in a features message, comprising an indication of the configuration of the broadcast/multicast server with respect to delayed response to the request message in step 1 (e.g., whether the broadcast/multicast server is configured to receive a delayed response or not). Such a features message may be transmitted to the application server upon the application server establishing initial contact with the broadcast/multicast server. In this way, the application server is also informed whether to expect a further information message (e.g., as in step 606 above) after receipt of the response message in step 604.

Figure 6:
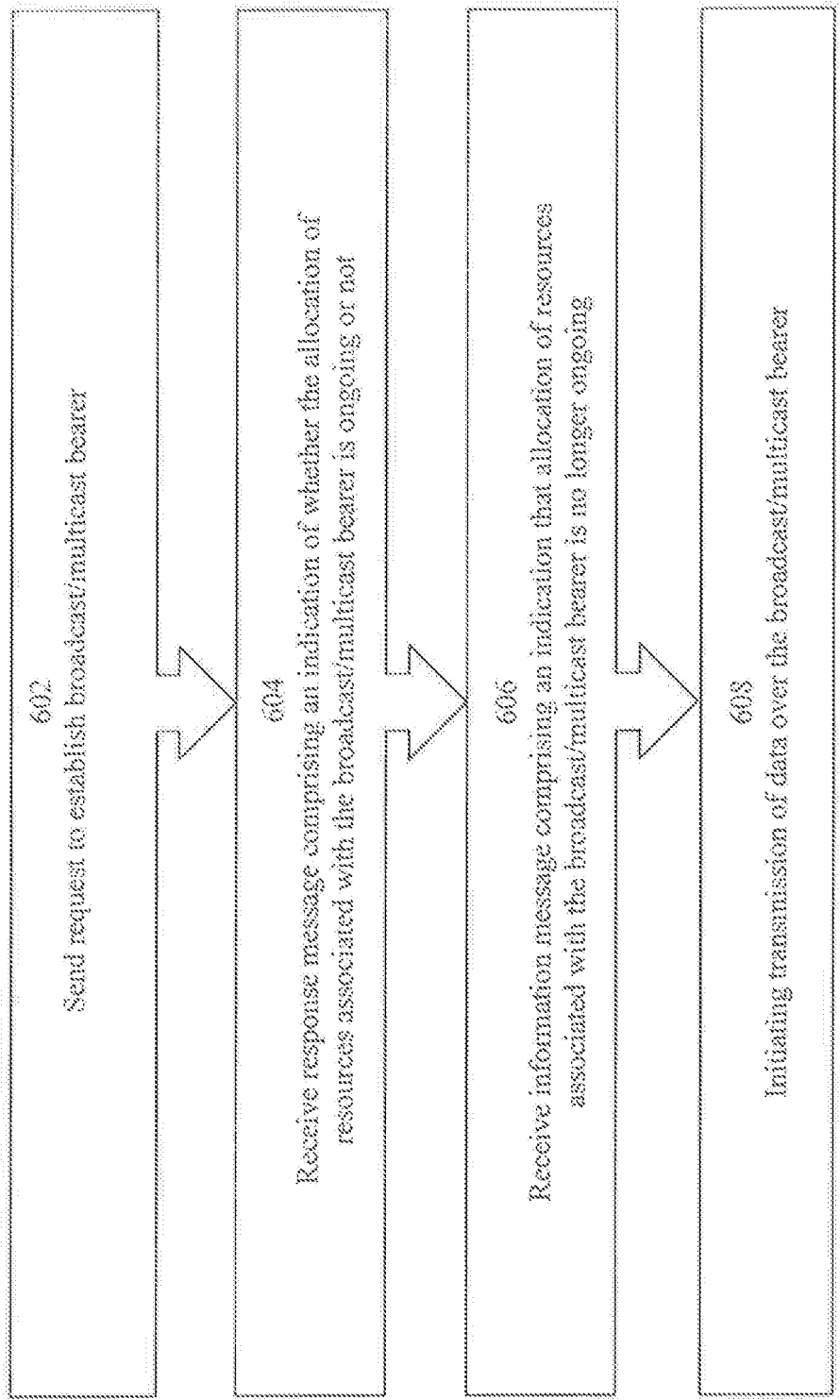
FIG. 6 is a flowchart of a method performed by are application server according to embodiments of the disclosure.
Figure 7:
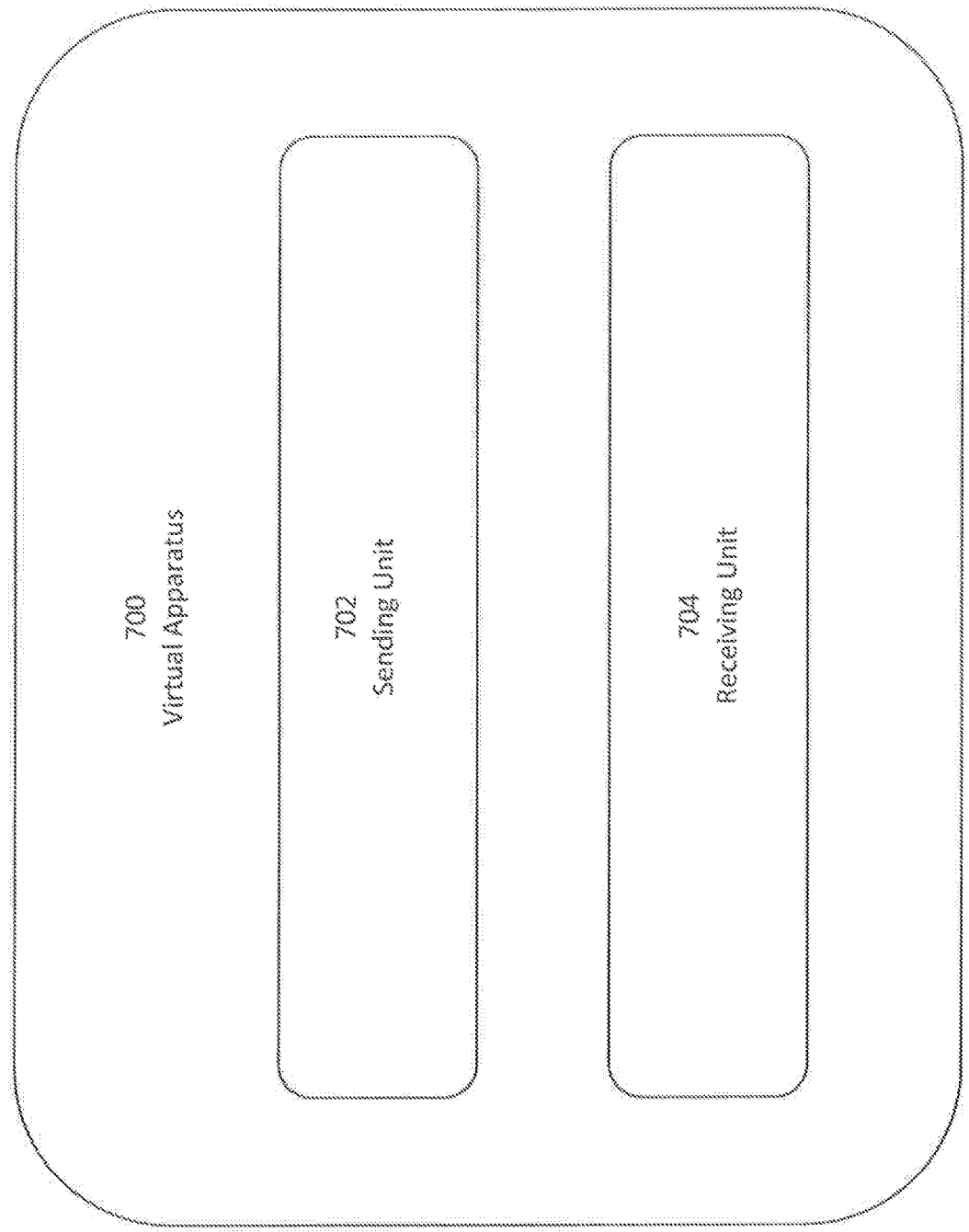
FIG. 7 is a schematic diagram of a virtual apparatus, configured to perform the method of FIG. 6.

FIG. 7 illustrates a schematic block diagram of an apparatus 700 in a communication network. The apparatus may be implemented in a network node (e.g., application server, GCS AS, shown in FIG. 3). Apparatus 700 is operable to carry out the example method described with reference to FIG. 6 and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 702 and receiving unit 704, and any other suitable units of apparatus 700 to perform corresponding functions according one or more embodiments of the present disclosure. Apparatus 700 may further comprise power supply circuitry configured to supply power to the apparatus.

As illustrated in FIG. 7, apparatus 700 includes sending unit 702 and receiving unit 704. Sending unit 702 is configured to send, to a broadcast/multicast server for a communication network, a request to establish a broadcast/multicast bearer in the communication network. Receiving unit 704 is configured to receive, from the broadcast/multicast server, a response message comprising an indication of whether the allocation of the resources associated with the broadcast/multicast bearer is ongoing or not.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks procedures, computations, outputs, and/or displaying functions, and so on, as such as those that are described herein.

Figure 8:
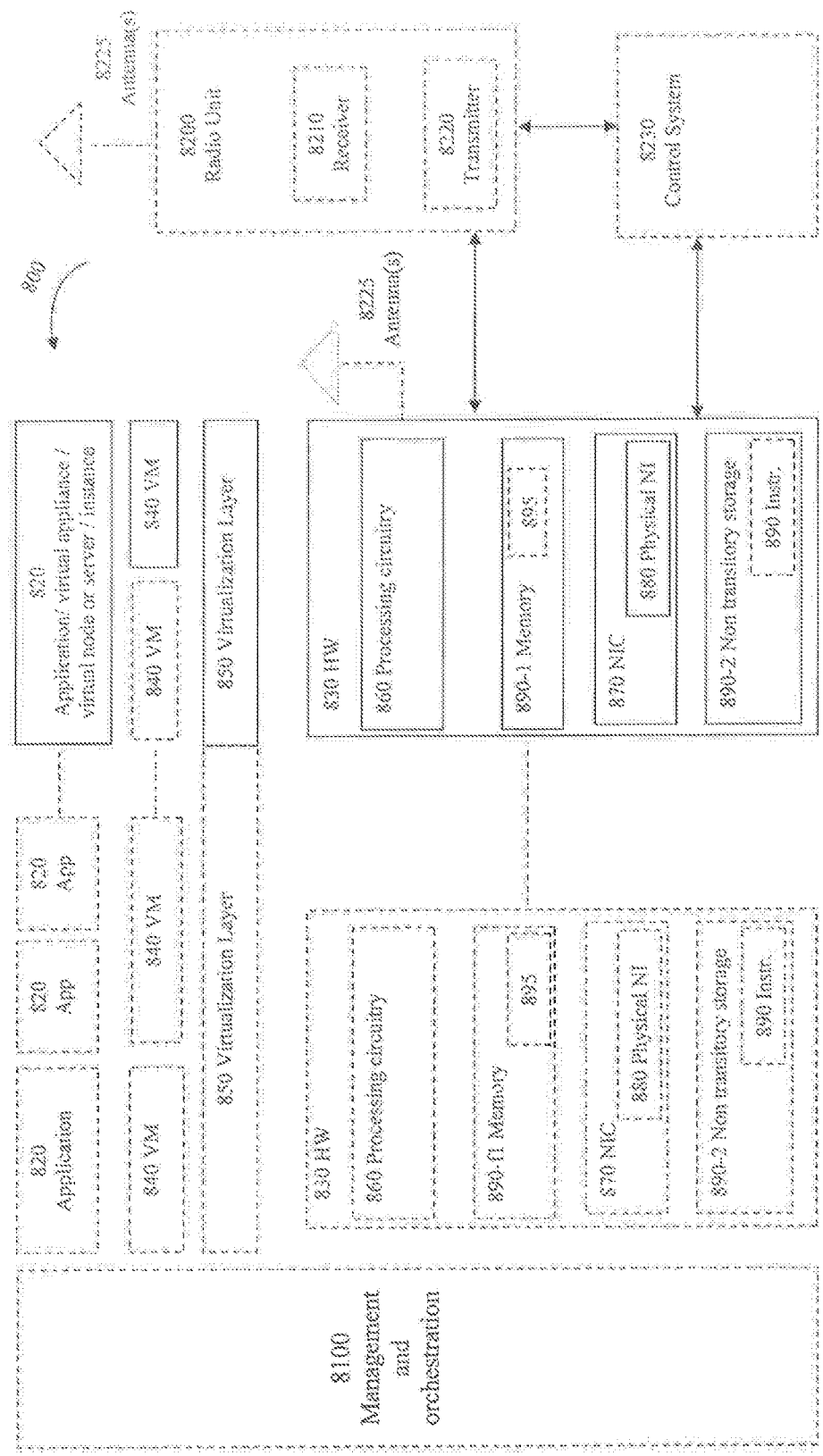
FIG. 8 shows a virtualization environment according to embodiments of the disclosure.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device e.g., a UE, a wireless device or any other type of communication device) or components thereof and relates to an implementation in which at least a portion of the functionality is implemented as one or more virtual components (e.g., via one or more applications, components, functions, virtual machines or containers executing on one more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each, hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with embodiments described herein Each hardware device may also include power supply circuitry, configured to supply power to the hardware device.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Appendix 1

Proposed Changes to 3GPP TS 29,468 (Italics Indicate Changes)

5.3.2 Activate MBMS Bearer Procedure

The Activate MBMS Bearer procedure may be used by the GCS AS to cause allocation of resources for MBMS bearer(s).

To apply this procedure, the GCS AS shall send a GCS-Action-Request (GAR) command including one MBMS-Bearer-Request AVP for each bearer that is to be activated. Within the MBMS-Bearer-Request AVP, the GCS AS shall include the MBMS-StartStop-Indication AVP set to "START" and the QoS-Information AVP, and the GCS AS may include the TMGI AVP, the MBMS-Start-Time AVP and the MB2U-Security AVP. If the MBMS Cell List feature is supported, the GCS AS shall also include the MBMS-Cell-List AVP, or the MBMS-Service-Area AVP, or both. If the MBMS Cell List feature is not supported, the GCS AS shall also include the MBMS-Service-Area AVP. If the GCS AS does not yet know whether the BM-SC supports the MBMS Cell List feature and includes the MBMS-Cell-List AVP, it shall also include the MBMS-Service-Area AVP.

*If the V2X Localized User Plane feature is supported, the GCS AS may include the Local-M1-Information AVP and the Local-MB2-U-Information AVP within the MBMS-Bearer-Request AVP.*

NOTE: The GCS AS can find out whether the BM-SC supports the MBMS Cell List feature *and the V2X Localized User Plane feature* prior to applying the Activate MBMS Bearer Procedure the first time by using the TMGI Allocation Procedure in advance.

If the GCS AS includes both the MBMS-Cell-List AVP and the MBMS-Service-Area AVP in the MBMS-Bearer-Request AVP, then the provided service areas shall be a complete set of the service areas that contains all the provided cells.

If the FEC feature is supported, the GCS AS may include the FEC-Request AVP in the MBMS-Bearer-Request AVP to request that BM-SC applies FEC (see IETF RFC 6363 [31]) to the downlink media streams within the MBMS bearer that are described by the FEC-Request AVP.

If the ROHC feature is supported, the GCS AS may include ROHC-Request AVP(s) in the MBMS-Bearer-Request AVP to request that BM-SC applies ROHC (see IETF RFC 5795 [29] and IETF RFC 3095 [30]) to the downlink media streams within the MBMS bearer that are described by the ROHC-Request AVP(s).

Upon reception of a GCS-Action-Request (GAR) command including the MBMS-Bearer-Request AVP with the MBMS-StartStop-Indication AVP set to "START", the BM-SC shall determine whether the GCS AS is authorized to use the TMGI. If no Route-Record AVP(s) are present, the BM SC shall derive the identity of the GCS AS from the Origin Host AVP. If Route-Record AVP(s) are present, the BM SC shall authorize the request if the identity, within the first Route-Record AVP matches the GCS AS authorized to use the TMGI. If the GCS AS is authorized to use the TMGI, the BM-SC shall allocate MBMS resources to support content delivery of the MBMS bearer to the requested MBMS broadcast area (as described via the MBMS-Cell-List AVP and/or MBMS Service Area AVP) using the Session Start procedure defined in 3GPP TS 23.246 [3]. If an MBMS-Cell-List AVP but no MBMS Service Area AVP is included in the MBMS-Bearer-Request AVP, the BM-SC shall derive MBMS service areas from the cells in the MBMS-Cell-List AVP based on operator policy. If both an MBMS-Cell-List AVP and an MBMS-Service-Area AVP are included, the BM-SC shall either derive MBMS service areas from the cells in the MBMS-Cell-List AVP based on operator policy and ignore the information in the MBMS-Service-Area AVP, or directly provide the information received within the MBMS-Service-Area AVP the Session Start procedure defined in 3GPP TS 23246 [3]. If no TMGI AVP is included in the MBMS-Bearer-Request AVP, the BM-SC shall allocate a new TMGI. The BM-SC shall allocate a new Flow Identifier. The BM-SC shall decide whether to use MB2-U Security, and shall take into account related requests of the GCS AS, as received within the MB2U-Security AVP in the MBMS-Bearer-Request AVP.

If the new MBMS service area overlaps with the service area of any active bearer with the same TMGI, the BM-SC should reject the activation request with the result code "Overlapping-MBMS-Service-Area".

The BM-SC shall then send GCS-Action-Answer (GAA) command including an MBMS-Bearer-Response AVP. The BM-SC shall include an MBMS-Bearer-Response AVP for each MBMS-Bearer-Request AVP that was included in the GAR. The MS-Bearer-Response AVP shall be included in the same position in the GAA that the corresponding MBMS-Bearer-Request AVP had in the GAR.

For a successful MBMS bearer activation, the MBMS-Bearer-Response AVP shall include the TMGI AVP, the DBMS-Flow-Identifier AVP, the MBMS-Session-Duration AVP, the BMSC-Address AVP and BMSC-Port AVP, and may include Radio-Frequency AVP(s) as MBMS bearer related service description. If MB2-U Security is applied, the MBMS-Bearer-Response AVP shall also include the MB2U-Security AVP. If FEC and/or ROHC was requested the MBMS-Bearer-Response AVP shall also include User-plane-Protocol-Result AVP(s) indicating the success or failure of the FEC and/or RHC activation. If the BM-SC is configured to receive a delayed session start response from the MBMS GW, the BM-SC shall indicate that the bearer activation procedure is still in progress in the MBMS-Bearer-Result AVP.

*If the V2X Localized User Plane supported feature is supported, and the Local-M1-Information AVP and Local-MB2-U-Information AVP are received from the GCS AS, and the BM-SC determines to use the local MBMS information, the SM-SC shall include the BMSC-Address AVP and the BMSC-Port with the IP address and port included in the received Local-MB2-U-Information AVP in the MBMS-Bearer-Response AVP. Otherwise, the BM-SC shall include the BMSC-Address AVP and the BMSC-Port with the IP address and port allocated by the BM-SC in the MBMS-Bearer-Request AVP.*

6.4.8 MBMS-Bearer-Result AVP

The MBMS-Bearer-Result AVP (AVP code 3506) is of type Unsigned32 and it shall contain a bit mask with values as defined table 6.4.8-1. Several bits indicating errors may be set in combination, Bit 0 and Bit xx may be set together to indicate that the request for bearer activation was successfully handled but the actual bearer activation is still ongoing.

TABLE 6.4.8-1

MBMS-Bearer-Result AVP

| Bit | Name | Description |
|---|---|---|
| 0 | Success | The requested bearer activation, modification or deactivation was successful; or the request for bearer activation was successfully handled. |
| 1 | Authorization rejected | The requested bearer activation, modification or deactivation failed because the BM-SC did not authorize it. |
| 2 | Resources exceeded | The requested bearer activation, modification or deactivation failed because the BM-SC could not provide sufficient resources. |
| 3 | Unknown TMGI | The requested bearer activation, modification or deactivation failed because the BM-SC did not know the requested TMGI or the TMGI expired. |
| 4 | TMGI not in use | The requested bearer modification or deactivation failed because the requested TMGI was not related to an active MBMS bearer. |
| 5 | Overlapping MBMS-Service-Area | The requested bearer modification failed because the requested Service area was overlapping with a service area already in use for the requested TMGI. |
| 6 | Unknown Flow identifier | The requested bearer modification or deactivation failed because the BM-SC did not know the requested Flow Identifier. |
| 7 | QoS Authorization Rejected | The requested bearer activation or modification failed because the BM-SC did not authorize the requested QoS. |
| 8 | Unknown MBMS-Service-Area | The requested bearer activation or modification failed because the BM-SC did not know the requested MBMS-Service-Area |
| 9 | MBMS-Service-Area Authorization Rejected | The requested bearer activation or modification failed because the BM-SC did not authorize the requested MBMS-Service-Area |
| 10 | MBMS-Start-Time | The requested bearer activation failed because the MBMS-Start-Time contained an inappropriate value. |
| 11 | Invalid AVP combination | The requested bearer activation, modification or deactivation failed because the provided AVP combination within the corresponding MBMS-Bearer-Request AVP was not allowed (e.g. because some mandatory AVPs for a given MBMS-StartStop-Indication value were missing). |
| 12 | System error | The requested procedure (e.g. bearer activation/modification) failed due to internal system error in the BM-SC. |
| xx | Activation ongoing | The requested bearer activation is still ongoing. |

Appendix 2

Proposed changes to 3GPP TS 29.468 (italics indicate changes)

5.3.2 Activate MBMS Bearer Procedure

The Activate MBMS Bearer procedure may be used by the GCS AS to cause allocation of resources for MBMS bearer(s).

To apply this procedure, the GCS AS shall send a GCS-Action-Request (GAR) command including one MBMS-Bearer-Request AVP for each bearer that is to be activated. Within the MBMS-Bearer-Request AVP, the GCS AS shall include the MBMS-StartStop-Indication AVP set to "START" and the QoS-Information AVP, and the GCS AS may include the TMGI AVP, the MBMS-Start Time AVP and the MB2U-Security AVP. If the MBMS Cell List feature is supported, the GCS AS shall also include the MBMS-Cell-List AVP, or the MBMS-Service-Area AVP, or both. If the MBMS Cell List feature is not supported, the GCS AS shall also include the MBMS-Service-Area AVP. If the GCS AS does not yet know whether the SM-SC supports the MBMS Cell List feature and includes the MBMS-Cell-List AVP, it shall also include the MBMS-Service-Area AVP.

If the V2X Localized User Plane feature is supported, the GCS AS may include the Local-M1-Information AVP and the Local-MB2-U-Information AVP with in the MBMS-Bearer-Request AVP.

NOTE: The GCS AS can find out whether the BM-SC supports the MBMS Cell List feature and the V2X Localized User Plane feature prior to applying the Activate MBMS Bearer Procedure the first time by using the TMGI Allocation Procedure in advance.

If the GCS AS includes both the MBMS-Cell-List AVP and the MBMS-Service-Area AVP in the MBMS-Bearer-Request AVP, then the provided service areas shall be a complete set of the service areas that contains all the provided cells.

If the FEC feature is supported, the GCS AS may include the FEC-Request AVP in the MBMS-Bearer-Request AVP to request that BM-SC applies FEC (see IETF RFC 6363 [31]) to the downlink media streams within the MBMS bearer that are described by the FEC-Request AVP.

If the ROHC feature is supported, the GCS AS may include ROHC-Request AVP(s) in the MBMS-Bearer-Request AVP to request that BM-SC applies ROHC (see IETF RFC 5795 [29] and IETF RFC 3095 [30]) to the downlink media streams within the MBMS bearer that are described by the ROHC-Request AVP(s).

Upon reception of a GCS-Action-Request (GAR) command including the MBMS-Bearer-Request AVP with the MBMS-StartStop-Indication AVP set to "START", the BM-SC shall determine whether the GCS AS is authorized to use the TMGI. If no Route-Record AVP(s) are present, the BM SC shall derive the identity of the GCS AS from the Origin Host AVP. If Route-Record AVP(s) are present, the BM SC shall authorize the request if the identity within the first Route-Record AVP matches the GCS AS authorized to use the TMGI. If the GCS AS is authorized to use the TMGI, the BM-SC shall allocate MBMS resources to support content delivery of the MBMS bearer to the requested MBMS broadcast area (as described via the MBMS-Cell-List AVP and/or MBMS Service Area AVP) using the Session Start procedure defined in 3GPP TS 23.246 [3]. If an MBMS-Cell-List AVP but no MBMS Service Area AVP is included in the MBMS-Bearer-Request AVP, the BM-SC shall derive MBMS service areas from the cells in the MBMS-Cell-List AVP based on operator policy. If both an MBMS-Cell-List AVP and an MBMS-Service-Area AVP are included, the BM-SC shall either derive MBMS service areas from the cells in the MBMS-Cell-List AVP based on operator policy and ignore the information in the MBMS-Service-Area AVP, or directly provide the information received within the MBMS-Service-Area AVP in the Session Start procedure defined in 3GPP TS 23.246 [3]. If no TMGI AVP is included in the MBMS-Bearer-Request AVP, the BM-SC shall allocate a new TMGI. The BM-SC shall allocate a new Flow Identifier. The BM-SC shall decide whether to use MB2-U Security, and shall take into account related requests of the GCS AS, as received within the MB2U-Security AVP in the MBMS-Bearer-Request AVP.

If the new MBMS service area overlaps with the service area of any active bearer with the same TMGI, the BM-SC should reject the activation request with the result code "Overlapping-MBMS-Service-Area".

The BM-SC shall then send GCS-Action-Answer (GAA) command including an MBMS-Bearer-Response AVP. The BM-SC shall include an MBMS-Bearer-Response AVP for each MBMS-Bearer-Request AVP that was included in the GAR. The MBMS-Bearer-Response AVP shall be included in the same position in the GAA that the corresponding MBMS-Bearer-Request AVP had in the GAR.

For a successful MBMS bearer activation, the MBMS-Bearer-Response AVP shall include the TMGI AVP, the MBMS-Flow-Identifier AVP, the MBMS-Session-Duration AVP, the BMSC-Address AVP and BMSC-Port AVP, and may include Radio-Frequency AVP(s) as MBMS bearer related service description. If MB2-U Security is applied, the MBMS-Bearer-Response AVP shall also include the MB2U-Security AVP. If FEC and/or ROHC was requested the MBMS-Bearer-Response AVP shall also include Userplane-Protocol-Result AVP(s) indicating the success or failure of the FEC and/or RHC activation. If the BM-SC is configured to receive a delayed session start response from the MBMS GW and the GCS AS indicated the support of Late MBMS Bearer Activation feature, the BM SC shall include the support of Late MBMS Bearer Activation feature in the Supported-Feature-List AVP.

If the V2X Localized User Plane supported feature is supported, and the Local-M1-Information AVP and Local-MB2-U-Information AVP are received from the GCS AS, and the BM-SC determines to use the local MBMS information, the BM-SC shall include the BMSC-Address AVP and the GMSC-Port with the IP address and port included in the received Local-MB2-U-Information AVP in the MBMS-Bearer-Response AVP. Otherwise, the BM-SC shall include the BMSC-Address AVP and the BMSC-Port with the IP address and port allocated by the BM-SC in the MBMS-Bearer-Request AVP.

\*\*\*Next Change\*\*\*

6.4.4 MBMS-Bearer-Event AVP

The MBMS-Bearer-Event AVP (AVP code 3502) is of type Unsigned32 and it shall contain a bit mask with values as defined table 6.4.4-1 Several bits may be set in combination except for bit 0 and bit 1.

TABLE 6.4.4-1

MBMS-Bearer-Event AVP

| Bit | Name | Description |
|---|---|---|
| 0 | Bearer Terminated | The MBMS bearer was terminated. |
| 1 | Bearer Activated | The MBMS bearer was activated. This bit is applicable for the Late MBMS Bearer Activation feature. |
| 2 | Userplane Event | The userplane event is reported, and the result is further indicated in the Userplane-Protocol-Result AVP. |

\*\*\*Next Change\*\*\*

6.5.2.2 Supported-Feature-List AVP for the MB2-C Application

The syntax of this AVP is defined in TS 29.229 [23].

For the MB2-C application, the meaning of the bits shall be as defined in table 6.5.2.2-1 for the Supported-Feature-List-ID of 1.

TABLE 6.5.2.2-1

Features of Feature-List-ID 1 used for MB2-C application

| Feature bit (NOTE 1) | Feature (NOTE 2) | M/O (NOTE 3) | Description (NOTE 4) |
|---|---|---|---|
| 0 | Heartbeat | O | This feature indicates the support of the Restoration functionality related Heartbeat procedures and procedures for the Restart-Counter AVP defined in clause 5.6.2, 5.6.3 and 5.6.4. |

TABLE 6.5.2.2-1-continued

Features of Feature-List-ID 1 used for MB2-C application

| Feature bit (NOTE 1) | Feature (NOTE 2) | M/O (NOTE 3) | Description (NOTE 4) |
|---|---|---|---|
| 1 | MBMS Cell List | M | This feature indicates the support of providing a MBMS-Cell-List AVP. |
| 2 | V2X Localized User Plane | O | This feature indicates the support of local MBMS based MBMS data delivery for V2X services (see 3GPP TS 23.285 [28] sub-clause 5.4.2.2 and Annex B.3). |
| 3 | FEC | O | This feature indicates the support of applying FEC (see IETF RFC 6363 [31]) to downlink packet streams at the BM-SC. |
| 4 | ROHC | O | This feature indicates the support of applying ROHC (see IETF RFC 5795 [29] and IETF RFC 3095 [30]) to downlink packet streams at the BM-SC. |
| xx | Late MBMS Bearer Activation | O | This feature indicates the support for late notification of MBMS bearer activation. |

(NOTE 1):
Feature bit: The order number of the bit within the Supported-Features AVP, e.g, "0".
(NOTE 2):
Feature: A short name that can be used to refer to the bit and to the feature, e.g. "".
(NOTE 3):
M/O: Defines if the implementation of the feature is mandatory ("M") or optional ("O").
(NOTE 4):
Description: A dear textual description of the feature.

Abbreviations

At least some of the following abbreviations may be used in this disclosure, if there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Hangover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master information Block
MME Mobility Management Entity
MSC Mobile Switching Center
NPDCCH Narrowband Physical Downlink Control Channel
NR New Radio
ONG OFDMA channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA.
WLAN Wide Local Area Network

The invention claimed is:

1. A method performed by a broadcast/multicast server in a communication network, comprising:
receiving, from an application server, a request to establish a broadcast/multicast bearer in the communication network;
allocating resources to initiate the establishment of the broadcast/multicast bearer in the communication network; and
before any determination that resources have been configured for the broadcast/multicast bearer in a radio access network of the communication network, sending, to the application server, a response message comprising an indication that the allocation of the resources associated with the broadcast/multicast bearer has been initiated and is ongoing.

2. The method of claim 1, further comprising, responsive to a determination that the allocation of the resources for the broadcast/multicast bearer in the radio access network is complete, sending an information message to the application server comprising an indication that allocation of the resources associated with the broadcast/multicast bearer is no longer ongoing.

3. The method of claim 2, wherein the indication that allocation of the resources associated with the broadcast/multicast bearer is no longer ongoing comprises an indication that that resources have been configured for the broadcast/multicast bearer in the radio access network.

4. The method of claim 1, wherein at least one of:
the broadcast/multicast server comprises a broadcast/multicast service center, BM-SC;
the broadcast/multicast bearer comprises a multimedia broadcast and multicast service, MBMS, bearer;
the application server comprises a group communication service application server, GCS AS; and the application server comprises one of: a mission-critical service application server, and a vehicle-to-everything, V2X, application server.

5. A method performed by an application server, the method comprising:
sending, to a broadcast/multicast server for a communication network, a request to establish a broadcast/multicast bearer in the communication network; and
before any determination that resources have been configured for the broadcast/multicast bearer in a radio access network of the communication network, receiving, from the broadcast/multicast server, a response message comprising an indication that the allocation of the resources associated with the broadcast/multicast bearer has been initiated and is ongoing.

6. The method of claim 5, further comprising, responsive to receipt of the response message, deferring transmission of data over the broadcast/multicast bearer.

7. The method of claim 5, further comprising receiving an information message from the broadcast/multicast server comprising an indication that allocation of the resources associated with the broadcast/multicast bearer is no longer ongoing.

8. The method of claim 7, wherein the indication that the allocation of the resources associated with the broadcast/multicast bearer is no longer ongoing comprises an indication that that resources have been configured for the broadcast/multicast bearer in the radio access network.

9. The method of claim 7, further comprising, responsive to receipt of the information message, initiating transmission of data over the broadcast/multicast bearer.

10. The method of claim 5, at least one of:
the broadcast/multicast server comprises a broadcast/multicast service center, BM-SC;
the broadcast/multicast bearer comprises a multimedia broadcast and multicast service, MBMS, bearer;
the application server comprises a group communication service application server, GCS AS; and
the application server comprises one of: a mission-critical service application server, and a vehicle-to-everything, V2X, application server.

11. A broadcast/multicast server, comprising:
processing circuitry configured to perform all the steps of claim 1; and
power supply circuitry configured to supply power to the broadcast/multicast server.

12. The method of claim 2, wherein the information message comprises a bitmap, the bitmap comprising one or more bits, the settings of the one or more bits indicating:
the allocation of the resources associated with the broadcast/multicast bearer was successful; or
the allocation of the resources associated with the broadcast/multicast bearer failed.

13. The method of claim 5, wherein the information message comprises a bitmap, the bitmap comprising one or more bits, the settings of the one or more bits indicating:
the allocation of the resources associated with the broadcast/multicast bearer was successful; or
the allocation of the resources associated with the broadcast/multicast bearer failed.

14. The method of claim 2, wherein the information message comprises a bitmap, the bitmap comprising a subset of multiple bits to indicate that the allocation of the resources associated with the broadcast/multicast bearer failed, with each of the multiple bits of the subset indicating a respective reason for the failure.

15. The method of claim 7, wherein the information message comprises a bitmap, the bitmap comprising a subset of multiple bits to indicate that the allocation of the resources associated with the broadcast/multicast bearer failed, with each of the multiple bits of the subset indicating a respective reason for the failure.

* * * * *